Patented Feb. 7, 1950

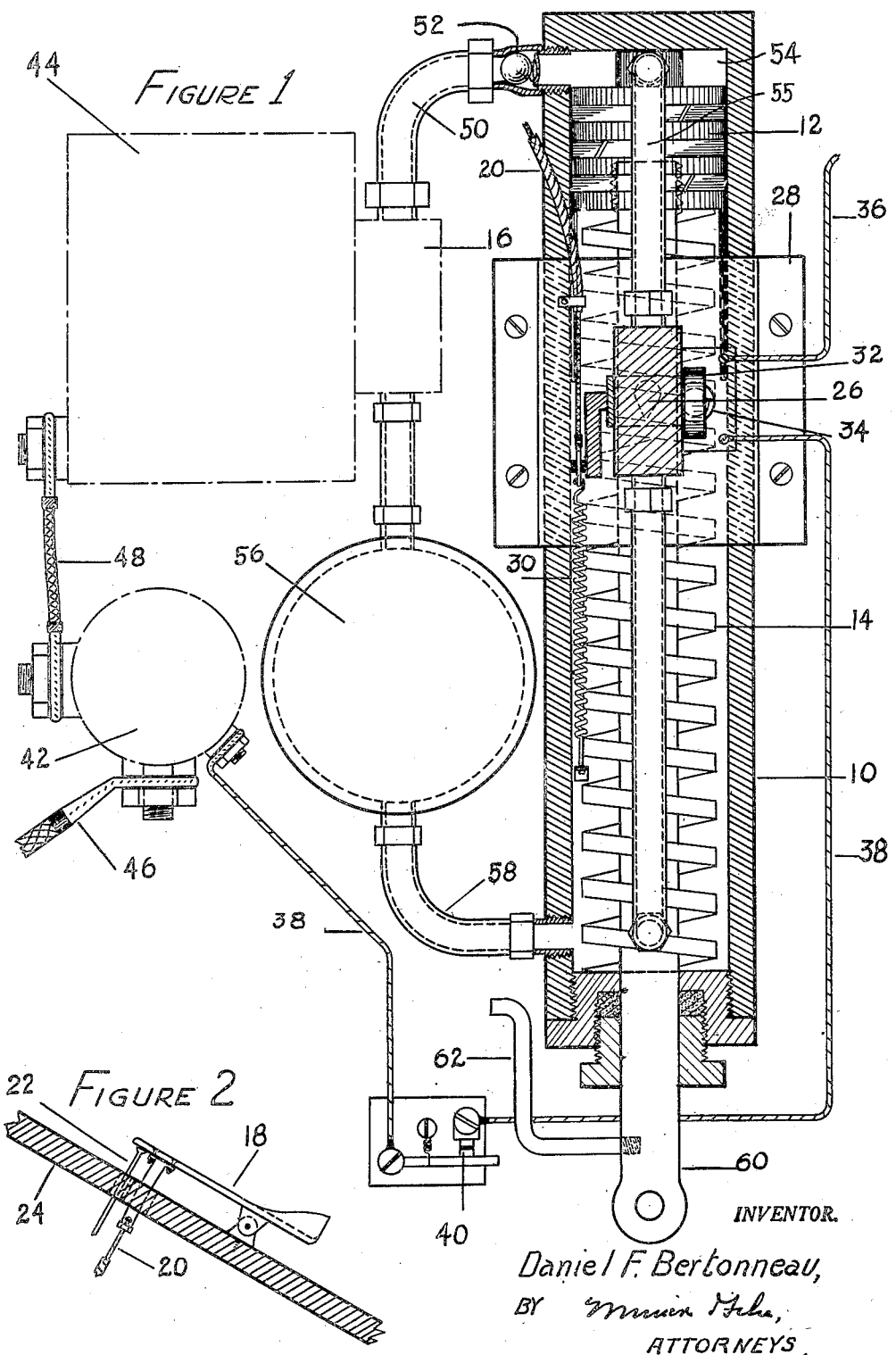

2,496,431

UNITED STATES PATENT OFFICE 2,496,431

ELECTROHYDRAULIC BRAKE ENERGIZER

Daniel F. Bertonneau, Los Angeles, Calif.

Application October 3, 1945, Serial No. 620,014

4 Claims. (Cl. 60—52)

This invention relates to an improved electro-hydraulic brake energizer, and the subject matter of the present application is related to my contemporaneous invention and co-pending application for United States Letters Patent entitled "Combination brake and throttle foot control," assigned Serial No. 620,013, filed October 3, 1945, now abandoned.

One of the important objects of this invention is to provide an electro-hydraulic brake energizer which can be conveniently and efficiently employed with my aforesaid combination brake and throttle foot control, and which is moreover particularly adapted for use with automotive vehicles, especially those of the internal combustion engine propulsion type.

Another and further important object of the invention is the provision of an electro-hydraulic brake energizer which can be used with my aforesaid combined brake and throttle control element whereby both the brake and throttle can be operated by a single foot pedal, which offers a vast increase in the safety of operation of automotive vehicles.

A still further important object of the invention is to provide in an electro-hydraulic brake energizer a mechanism which will eliminate lost motion, lost time and body fatigue entailed in use of the conventional brake and throttle arrangement, permitting a faster and more certain application of automotive brakes.

A still further important object of the invention resides in the provision of an electro-hydraulic brake energizer which will automatically act as a parking brake when the ignition switch of the car is cut off and the energizer set. Additionally, the parking brake is automatically released when the ignition is again cut in.

Another and still further important object of the invention is to provide in an electro-hydraulic brake energizer a means whereby undesirable backward motion of the car on hills is prevented in that the driver of the car is enabled to go directly from brake to throttle operation without lost time or motion.

Other and further important objects of the invention will be apparent from the disclosures in the accompanying drawing and following specification.

The invention, in a preferred form, is shown in the drawing and hereinafter more fully described.

In the drawing:

Figure 1 is a detail view, partly in section, and parts being broken away, others being merely diagrammatic, of the electro-hydraulic brake energizer of this invention, showing generally the construction.

Figure 2 is a side elevation, partly in section, of the unitary brake and throttle control which is auxiliary to the invention, but which forms the subject matter of the above described separate application for Letters Patent.

As shown in the drawing:

The reference numeral 10 indicates generally the cylinder which contains the hydraulic fluid and in this cylinder is positioned a piston 12 and a compression spring 14 behind the piston. The compression spring interacts with the braking system of the vehicle by reaction thrust transmitted through the ramrod 60, and there is an electrically driven gear type hydraulic pump 16. Application of the brakes is effected by means of the expansive power of the spring 14 and release of the brakes is accomplished by means of hydraulic pressure from the pump 16 acting upon the piston.

The combined brake and throttle pedal 18 of Figure 2 controls the operation of the brake energizer through a flexible control 20, and this foot pedal 18 also controls the throttle of the automobile by means of a pin 22, which passes through the floorboard 24 of the automobile. These elements and the operation thereof are more fully described in my co-pending application for patent. Suffice it to say that the degree of depression of the rearmost portion of the pedal 18 by means of heel pressure controls the opening and closing of the hydraulic fluid control valve 26 of the energizer by means of a flexible wire control 20. The valve and terminus of the wire control 20 are mounted on the bridge 28, which extends over the cylinder 10. The valve 26 is a conventional shut-off valve controlling fluid flow through the central conduit 55 connecting the cavity 54 with the main cavity of the cylinder 10.

As illustrated in the drawing, the spring 14 is at its maximum limit of expansion and the valve 26 is in the closed position. Normally the expansion of the spring would be further limited by the resistance of the braking system when full application of the brakes is accomplished. Return of the valve from the closed to the opened position is accomplished by a coiled spring 30, and this operates when the combined brake and throttle pedal is at a neutral or at an advanced throttle position. Valve 26 is normally open and operation of the motor 44 and its integral hydraulic pump 16 forces hydraulic fluid through the fluid line 50, past the check valve 52 and into the pressure chamber 54 above the piston 12, This forces the piston and ramrod downward, compressing the spring 14. When the piston 12 moves upwardly in the cylinder 10 the flow of fluid exhausted from 54 by this upward movement of the piston is through the central conduit 55, valve 26 (which would then be in an open position due to release of the pedal 18 and retraction of spring 30), through the space at the rod end of cylinder 10, and through conduit 58 to tank 56.

When the valve 26 is in the closed position, an eccentric cam 32 depresses the remote control electrical contact switch 34. This switch is energized from the electrical system of the vehicle through the ignition switch by means of a wire 36.

When the remote control switch is depressed by the cam 32, the electrical circuit is closed and the wire 38 is energized through the closed breaker switch 40, actuating a relay 42, which in turn energizes an electric motor illustrated diagrammatically at 44. This is accomplished through the battery cable 46 and the bus connection 48, the cable 46 being connected to the battery of the car.

Operation of the motor 44 and the integral hydraulic pump 16 forces hydraulic fluid through the fluid line or tube 50 past the check valve 52 and into the pressure chamber 54, which comprises one end of the cylinder 10, and this forces the piston 12 downwardly against the pressure of the spring 14, thereby compressing said spring and thrusting the ramrod 60 outwardly from the cylinder.

The pump 16 draws fluid from the reserve fluid and expansion tank 56, the supply of which is augmented when the pump is in operation by discharge from the cylinder 10 through the line 58, as will be obvious.

So long as the pump continues in operation, the piston 12 and associated ramrod 60 are forced downwardly until the breaker arm 62 attached to the ramrod 60 contacts the breaker switch 40, which opens the circuit. The position of this breaker switch is adjustable so that it may be set to permit sufficient action of the ramrod to assure full release of the brakes.

At any point in the travel of the piston 12 and ramrod 60 the direction of motion may be stopped and reversed by proper action of the foot pedal and again stopped and started in the original direction, giving complete control over the braking operations. Obviously, this operation is always governed by the mechanical limits of the device itself.

It will be seen that herein is provided an electro-hydraulic brake energizer which, with the associated combination brake and throttle control, provides a highly important safety feature in automotive vehicle operation. Release of brakes only is dependent upon the electrical and hydraulic systems, and failure of either cannot prevent fullest application of the brakes. Opening of the control valve or even a break in the hydraulic system would merely cause return of the piston to its maximum extended position and according application of the brakes in spite of any failure of the electrical system.

It will be seen that in addition to the safety feature and an elimination of lost motion and body fatigue by the use of a single brake and throttle control, the customary separate brake and throttle control devices can be eliminated and both units incorporated in a single pedal. More certain application of the brakes is provided and the possibility of the operator's foot slipping off the brake if the same is oily or wet, or of missing the pedal entirely in an emergency is eliminated. The energizer develops sufficient force to permit harder and more durable brake linings to be used, in addition to the fact that better braking action results. The energizer will compensate for normal wear of brake linings by virtue of the reserve travel range of the piston, which automatically advances further as the linings wear, thereby eliminating the necessity of frequent brake adjustments.

The energizer is fool-proof in that failure of the system will itself automatically cause application of the brakes and the device has large reserves of power in every phase, thereby providing dependable controlled power brakes of such simplicity as to be readily usable on any car without an extensive alteration of the existing braking and electrical systems.

I am aware that many changes may be made and numerous details of construction varied throughout a wide range without departing from the principles of this invention, and I, therefore, do not propose limiting the patent granted hereon otherwise than as necessitated by the claims hereto appended.

I claim as my invention:

1. A brake energizer for vehicles comprising a cylinder, a spring-compressing piston therein, a hydraulic fluid system including a motor-driven pump, means for forcing fluid into the cylinder ahead of the piston, whereby the spring is compressed, said means being controlled by a foot pedal on the floorboard of the vehicle, and a valve governing the fluid control, together with a cam operating in conjunction with said valve to control said motor-driven pump.

2. A brake energizer for vehicles comprising a cylinder, a spring-compressing piston therein, a hydraulic fluid system including a motor-driven pump, means for forcing fluid into the cylinder ahead of the piston, whereby the spring is compressed, said means being controlled by a foot pedal on the floorboard of the vehicle, and a valve governing the fluid control, together with a cam operating in conjunction with the said valve, and a remote control contact switch associated with the cam and controlling said motor-driven pump.

3. A brake energizer for vehicles comprising a cylinder, a spring-compressing piston therein, a hydraulic fluid system including a motor-driven pump, means for forcing fluid into the cylinder ahead of the piston, whereby the spring is compressed, said means being controlled by a foot pedal on the floorboard of the vehicle, and a valve governing the fluid control, together with a cam operating in conjunction with said valve, and a remote control electrical contact switch associated with the cam and a relay energized when the switch is closed to energize in turn the said pump motor.

4. A brake energizer for vehicles comprising a cylinder, a spring-compressing piston therein, a ramrod associated with the piston, a hydraulic fluid system including a motor-driven pump, means for forcing fluid into the cylinder ahead of the piston, whereby the spring is compressed, said means being controlled by a foot pedal on the floorboard of the vehicle, and a valve governing the fluid control, together with a cam operating in conjunction with said valve, a remote control electrical contact switch associated with the cam and a relay energized when the switch is closed, the relay in turn energizing the pump motor and a breaker switch associated with the ramrod acting to de-energize said pump motor.

DANIEL F. BERTONNEAU.

REFERENCES CITED

The following references are of record in the file of this patent:

UNITED STATES PATENTS

| Number | Name | Date |
| --- | --- | --- |
| 1,774,836 | Lormüller | Sept. 2, 1930 |
| 1,778,317 | Goldman | Oct. 14, 1930 |
| 2,031,062 | Peabody et al. | Feb. 18, 1936 |
| 2,042,202 | Althouse | May 26, 1936 |
| 2,083,940 | Burton et al. | June 15, 1937 |
| 2,183,283 | Sampietro | Dec. 12, 1939 |
| 2,318,610 | Hyatt et al. | May 11, 1943 |
| 2,330,739 | Piron | Sept. 28, 1943 |